(12) United States Patent
Sarma et al.

(10) Patent No.: US 8,660,899 B2
(45) Date of Patent: Feb. 25, 2014

(54) TRANSFERRING BEHAVIORAL PROFILES ANONYMOUSLY ACROSS DOMAINS FOR BEHAVIORAL TARGETING

(75) Inventors: Joydeep Sen Sarma, Sunnyvale, CA (US); Wu Wang, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1958 days.

(21) Appl. No.: 11/641,278

(22) Filed: Dec. 19, 2006

(65) Prior Publication Data
US 2008/0147480 A1 Jun. 19, 2008

(51) Int. Cl.
*G06Q 30/00* (2012.01)

(52) U.S. Cl.
USPC .................. 705/14.66; 709/216; 709/232

(58) Field of Classification Search
USPC .................................. 709/216, 232
See application file for complete search history.

(56) References Cited

U.S. PATENT DOCUMENTS

| | | | |
|---|---|---|---|
| 6,009,409 A | 12/1999 | Adler et al. | |
| 6,026,368 A * | 2/2000 | Brown et al. | 705/14 |
| 6,134,532 A * | 10/2000 | Lazarus et al. | 705/14 |
| 6,401,075 B1 | 6/2002 | Mason et al. | |
| 6,714,975 B1 * | 3/2004 | Aggarwal et al. | 709/224 |
| 6,826,572 B2 | 11/2004 | Colace et al. | |
| 6,907,566 B1 | 6/2005 | McElfresh et al. | |
| 7,043,483 B2 * | 5/2006 | Colace et al. | 707/10 |
| 2001/0034646 A1 * | 10/2001 | Hoyt et al. | 705/14 |
| 2001/0047397 A1 * | 11/2001 | Jameson | 709/217 |
| 2002/0002483 A1 * | 1/2002 | Siegel et al. | 705/10 |
| 2003/0046161 A1 | 3/2003 | Kamangar et al. | |
| 2003/0065558 A1 * | 4/2003 | Shaw et al. | 705/14 |
| 2003/0149938 A1 | 8/2003 | McElfresh et al. | |
| 2004/0093327 A1 * | 5/2004 | Anderson et al. | 707/3 |
| 2004/0186776 A1 * | 9/2004 | Llach | 705/14 |
| 2005/0010477 A1 | 1/2005 | Sullivan et al. | |
| 2005/0154746 A1 | 7/2005 | Liu et al. | |
| 2006/0282327 A1 * | 12/2006 | Neal et al. | 705/14 |
| 2008/0015927 A1 * | 1/2008 | Ramirez | 705/10 |

OTHER PUBLICATIONS

Ramirez, Francisco, System and method for enabling onine privacy, marketing reserach and promotions. Jul. 7, 2006, 18 pages.*

* cited by examiner

*Primary Examiner* — John Van Bramer
*Assistant Examiner* — Stacie Gatling
(74) *Attorney, Agent, or Firm* — Brinks Gilson & Lione

(57) ABSTRACT

A system and method are disclosed for transferring a behavior profile anonymously across multiple domains. The behavior profile may be established from a first domain, but transferred anonymously such that it is accessible by other domains. The behavior profile may be used for generating targeted advertisements.

7 Claims, 5 Drawing Sheets

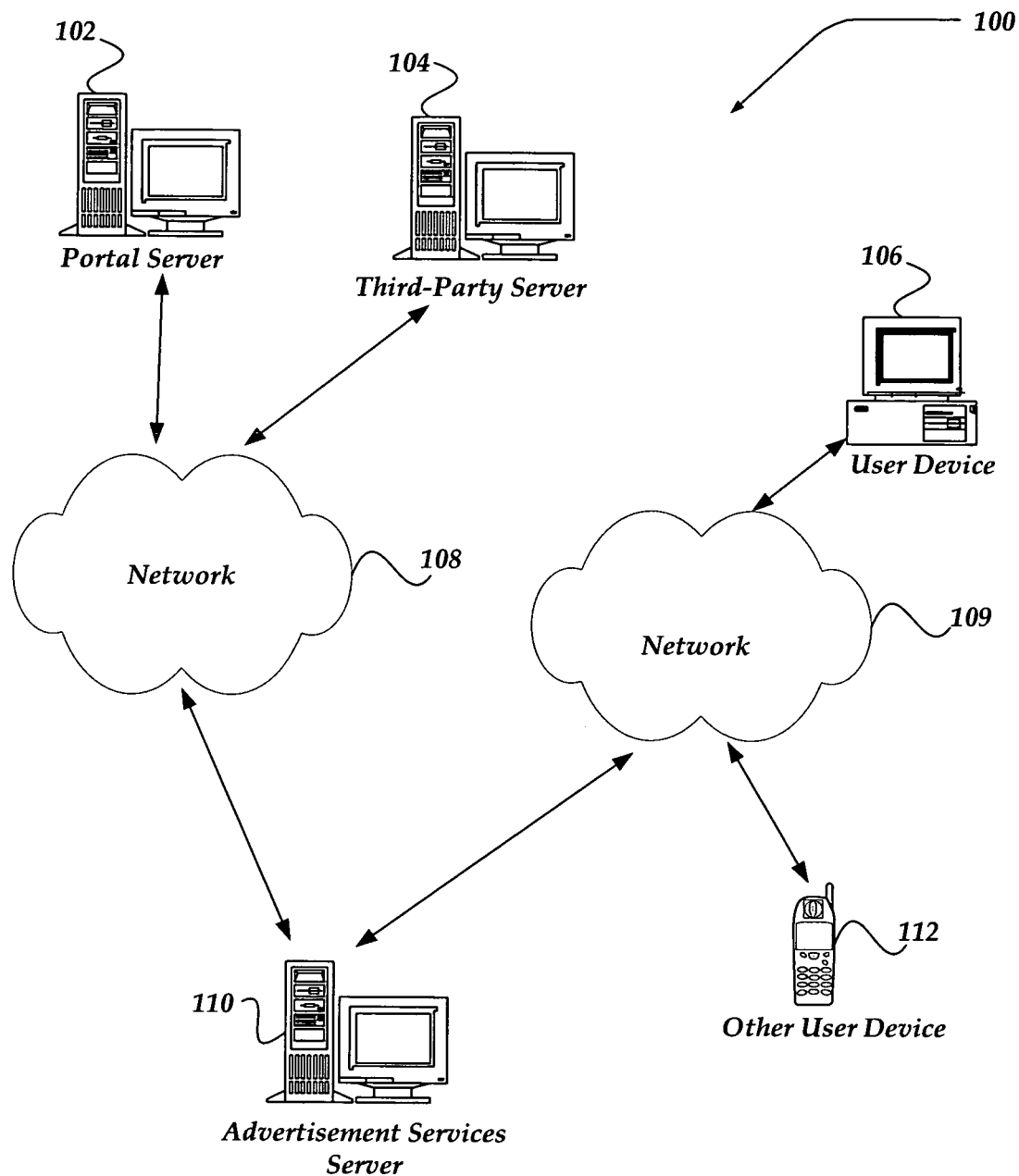

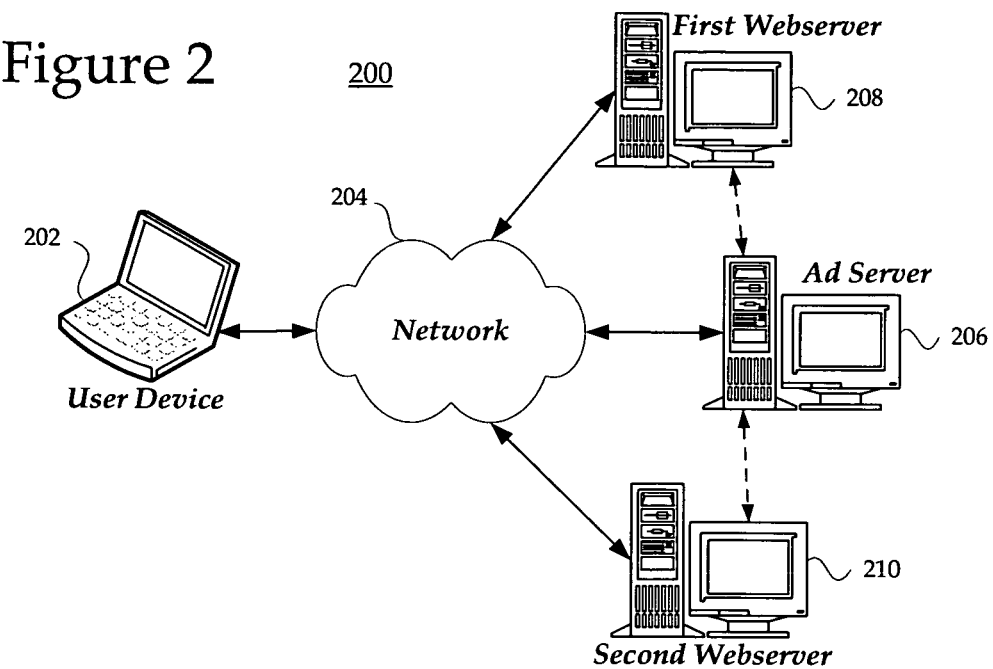
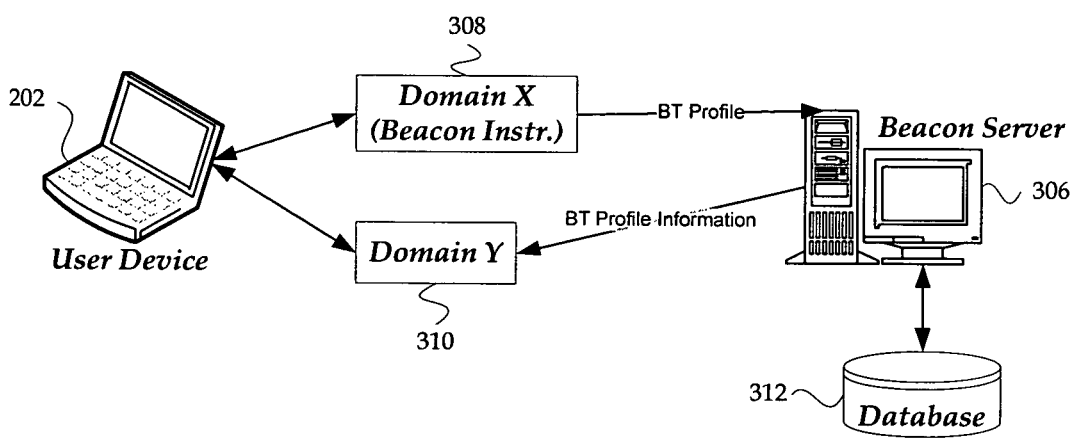

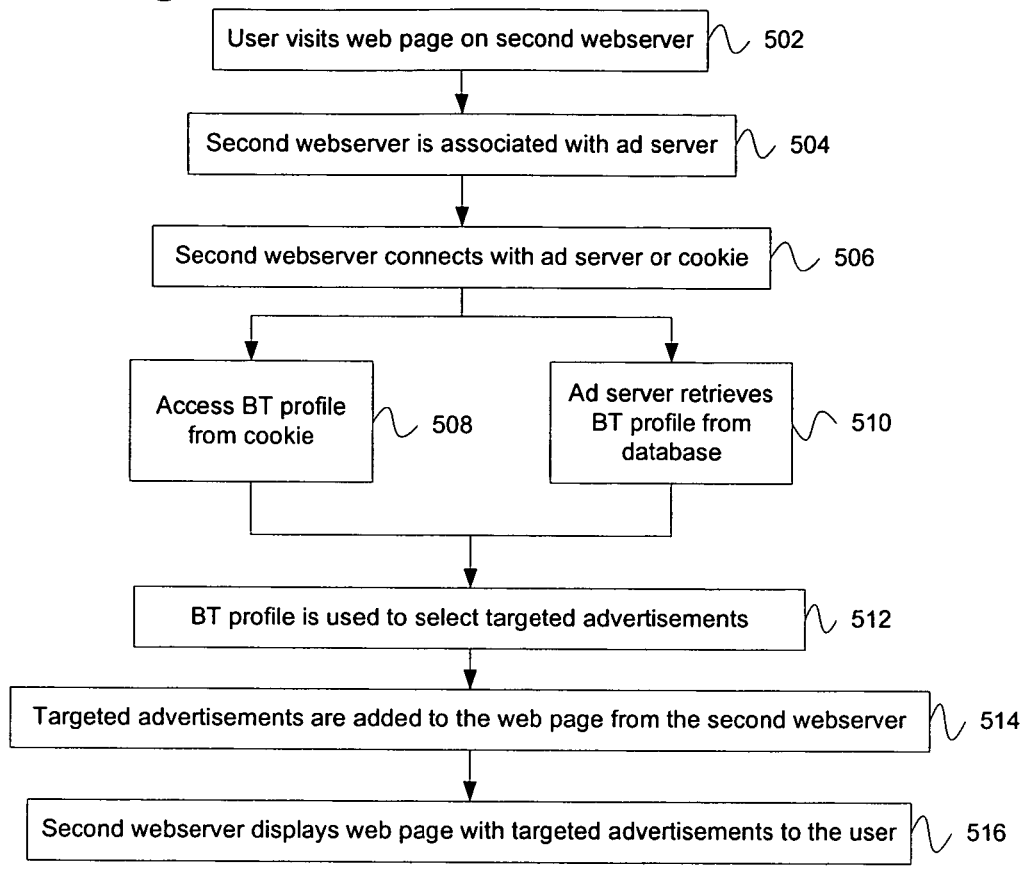
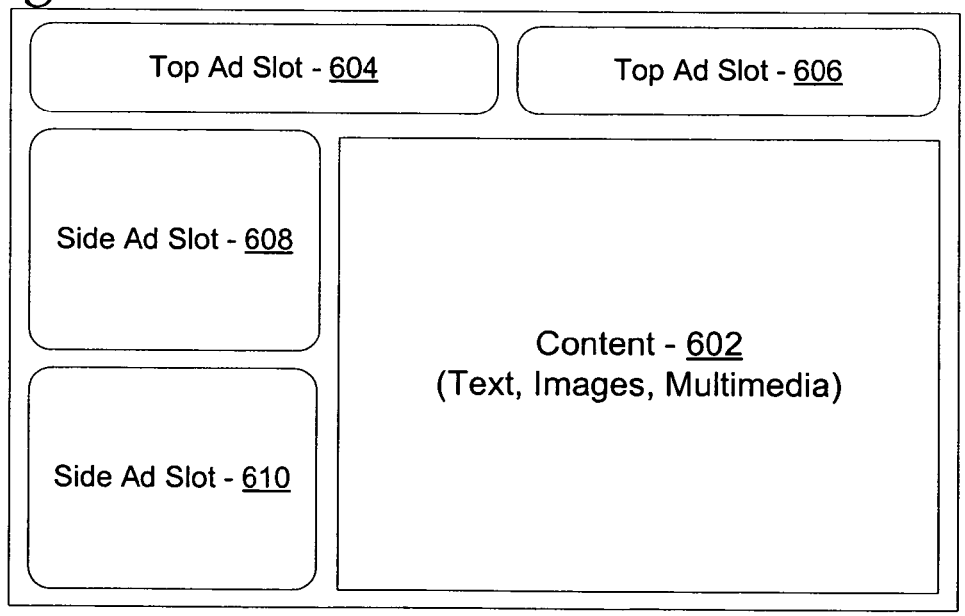

TRANSFERRING BEHAVIORAL PROFILES ANONYMOUSLY ACROSS DOMAINS FOR BEHAVIORAL TARGETING

BACKGROUND

Online advertising is an important source of revenue for enterprises engaged in electronic commerce. A number of different kinds of page-based online advertisements are currently in use, along with various associated distribution requirements, advertising metrics, and pricing mechanisms. Processes associated with technologies such as Hypertext Markup Language (HTML) and Hypertext Transfer Protocol (HTTP) enable a page to be configured to contain a location for inclusion of an advertisement. An advertisement can be selected for display each time the page is requested, for example, by a browser or server application.

Advertisers in all forms of media attempt to target the advertisements to the audience. For example, television commercials during a football game tend to target males. Likewise, online advertisers look for ways to target their advertisements to particular users. Advertisements may be targeted based on the content of the page, such as ads targeted to males on a football related website. Another way online advertisers provide targeted advertisements is through behavior tracking based on a behavioral profile. For example, a user who views financial websites and data frequently may be targeted for advertisements related to finance or banking. In order to be most effective, the behavioral tracking should be accurate, thorough, and accessible via different domains and/or websites. A behavioral profile generated by one domain should be accessible by another domain. In order to transfer the behavioral profile across domains, a user identification is transferred which may implicate security related issues, e.g. passing personally identifiable information across unsecured domains. In addition, domains may access one another's databases which results in duplicate infrastructure and increased hardware/operation costs.

The transfer of a behavioral profile should avoid passing any personal information to ensure user privacy. In addition, the more data that is available, the more accurate the targeted advertisements will be. Accordingly, it may be beneficial to share behavioral targeting data anonymously between websites to develop a comprehensive and accurate behavior tracking profile for online users without sacrificing user privacy.

BRIEF DESCRIPTION OF THE DRAWINGS

The system may be better understood with reference to the following drawings and description. Non-limiting and non-exhaustive embodiments are described with reference to the following drawings. The components in the Figures are not necessarily to scale, emphasis instead being placed upon illustrating the principles of the invention. In the Figures, like referenced numerals designate corresponding parts throughout the different views.

FIG. 1 provides a view of one embodiment of an operating environment;

FIG. 2 is a block diagram of an exemplary user system;

FIG. 3 is a block diagram of an alternate exemplary user system;

FIG. 5 is a flowchart depicting an alternate embodiment of the transfer of behavioral data in an exemplary system;

FIG. 6 is an illustration of an exemplary page displaying advertisements; and

DETAILED DESCRIPTION

Figure 4:
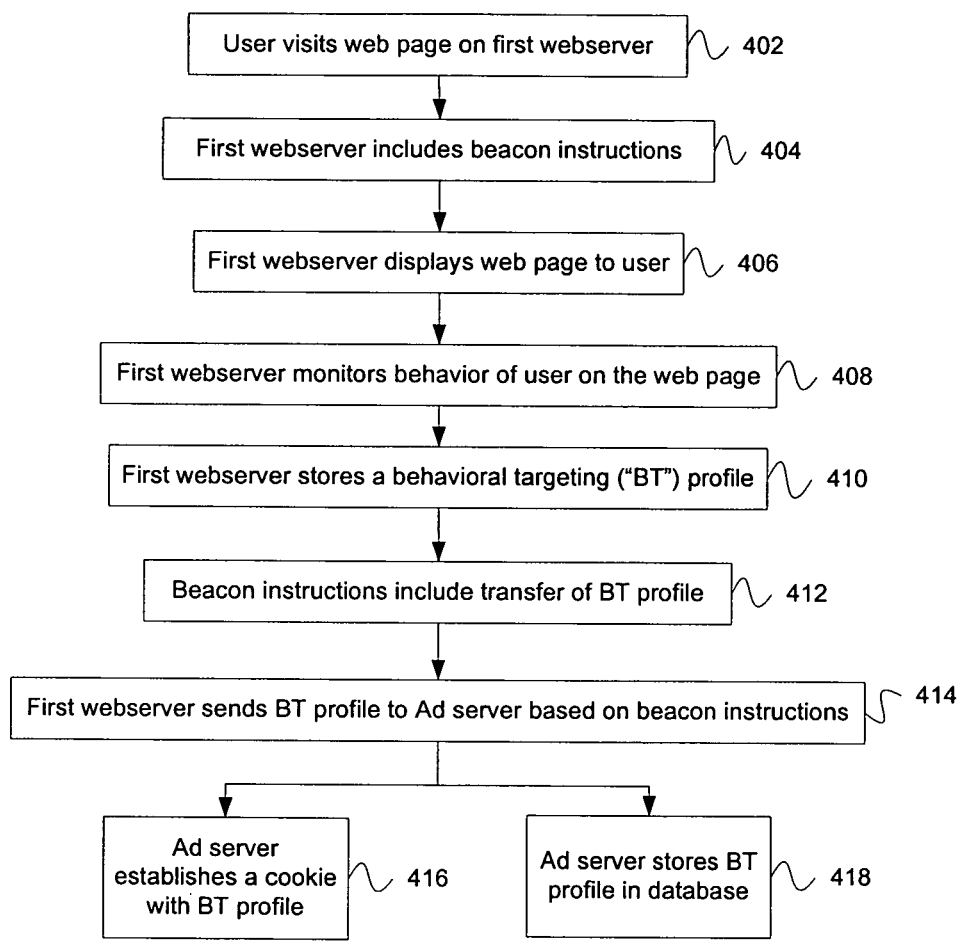
FIG. 4 is a flowchart depicting an embodiment of the transfer of behavioral data in an exemplary system.

The principles described herein may be embodied in many different forms. By way of introduction, the embodiments described below relate to a system and method for sharing and transferring behavioral profiles. The behavioral profiles may be established or developed based on activity on one website, and transferred anonymously to a second website. Accordingly, a second website may utilize the behavioral tracking data from other websites anonymously to effectively provide targeted advertisements that are relevant to their users based on the behavioral tracking data. The behavioral profile may be referred to interchangeably as a behavior profile or a behavioral targeting profile.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims and be defined by the following claims. Nothing in this section should be taken as a limitation on those claims. Further aspects and advantages are discussed below in conjunction with the preferred embodiments.

FIG. 1 provides a simplified view of a network environment 100. Not all of the depicted components may be required, however, and some embodiments of the invention may include additional components not shown in the figure. In any of FIGS. 1-3, or 6-7, variations in the arrangement and type of the components may be made without departing from the spirit or scope of the claims as set forth herein. Additional, different or fewer components may be provided.

In FIG. 1, environment 100 represents a network environment in which advertisements are displayed to users. Environment 100 includes an advertisement services server 110, which may provide a platform for selection, optimization, and/or distribution of advertisements for inclusion in pages, such as web pages (e.g. FIG. 6). In particular, FIG. 1 displays an environment within which behavioral profiles and targeted advertisements may be utilized as described below in FIGS. 2-5. Web pages may be provided to users by a portal server 104 and/or a third-party server 102. In FIG. 1, users are represented by a user device 106, depicted as a conventional personal computer, and/or other device such as a mobile user device 112, including a network-enabled mobile phone, personal digital assistant (PDA), pager, network-enabled television, digital video recorder, such as TIVO®, and/or automobile. The user devices 106 and 112 may be the user device described below in FIG. 7.

Some or all of advertisement services server 110, portal server 104, and third-party server 102 may be in communication or coupled with each other by way of network 108 and may be the system or components described below in FIG. 7. Herein, the phrase "coupled with" is defined to mean directly connected to or indirectly connected through one or more intermediate components. Such intermediate components may include both hardware and software based components.

The advertisement services server 110 and portal server 104 may each represent multiple linked computing devices, and multiple third-party servers, such as third-party server 102, may be included in environment 100. The network 108 may be regarded as a public or private network connection and may include, for example, a virtual private network or an encryption or other security mechanism employed over the public Internet, or the like. User device 106 and mobile user device 112 are represented by user-interactive devices that typically run browser applications, and the like, to display requested pages received over a network. The user may be a consumer of goods of services that is searching for a business such as a business of the advertiser. Such devices are in communication with the portal server 104 and/or third-party server 102 by way of network 109. Network 109 may include the Internet and may include all or part of the network 108; the network 108 may include all or part of the network 109. Networks 108 and/or 109 may be the network discussed below in FIG. 7.

Portal server 104, third-party server 102, advertisement services server 110, user device 106, and mobile user device 112 represent computing devices of various kinds. Such computing devices may generally include any device that is configured to perform computation and that is capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, user device 106 may be configured to execute a browser application that employs HTTP to request information, such as a web page, from a web server, which may be a process executing on portal server 104 or third-party server 102.

Networks 108, 109 may be configured to couple one computing device to another computing device to enable communication of data between the devices. Networks 108, 109 may generally be enabled to employ any form of machine-readable media for communicating information from one device to another. Each of networks 108, 109 may include one or more of a wireless network, a wired network, a local area network (LAN), a wide area network (WAN), a direct connection such as through a Universal Serial Bus (USB) port, and the like, and may include the set of interconnected networks that make up the Internet. Networks 108, 109 may include any communication method by which information may travel between computing devices. The advertisement services server 110 may be used for providing advertisements that are displayed to users 106.

FIG. 2 is a block diagram of an exemplary user system 200. System 200 may represent an alternate embodiment of environment 100. In the user system 200, user device 202 is coupled with a network 204. A first webserver 208, an advertisement ("ad") server 206, and a second webserver 210 are also coupled with the network 204.

The network 204 may generally be enabled to employ any form of machine-comprehensible media for communicating information from one device to another and may include any communication method by which information may travel between devices. The network may be a network 726 as described in FIG. 7. For example, the network 204 may include one or more of a wireless network, a wired network, a local area network (LAN), a wide area network (WAN), a direct connection such as through a Universal Serial Bus (USB) port, and the like, and may include the set of interconnected networks that make up the Internet. The wireless network may be a cellular telephone network, a network operating according to a standardized protocol such as IEEE 802.11, 802.16, 802.20, published by the Institute of Electrical and Electronics Engineers, Inc., or WiMax network. Further, the network 204 may be a public network, such as the Internet, a private network, such as an intranet, or combinations thereof, and may utilize a variety of networking protocols now available or later developed including, but not limited to TCP/IP based networking protocols.

Figure 7:
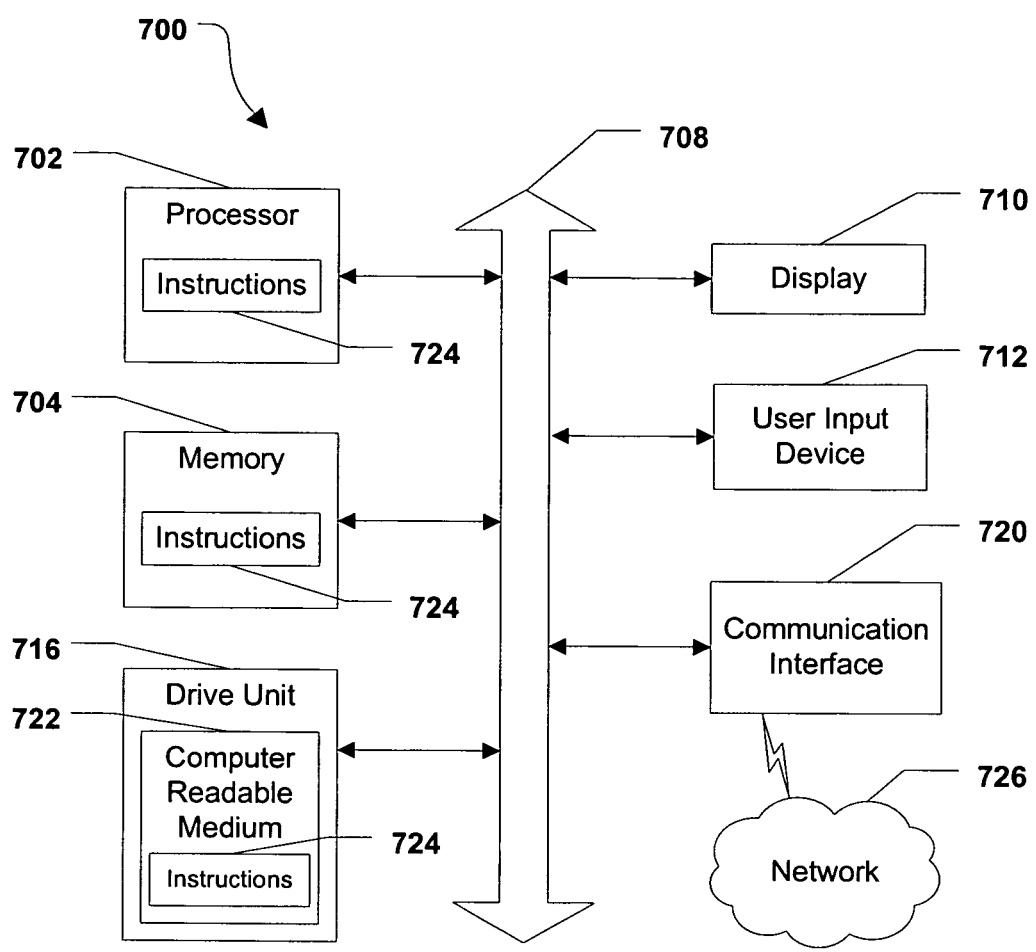
FIG. 7 is an illustration a general computer system.

The user device 202 may be the user device 106 or other user device 112 from FIG. 1, or the user input device 712 in FIG. 7. User device 202 may be an interface for a consumer or user to access the network 204 and the first webserver 208, second webserver 210, and/or the ad server 206. The user of user device 202 may be a consumer of goods or services that is requesting information, or conducting a transaction, such as on a web site on the Internet. Alternatively, a user may include a business entity or group of people, rather than an individual person. User device 202 may include a conventional personal computer, a mobile user device, including a network-enabled mobile phone, VoIP phone, cellular phone, personal digital assistant (PDA), pager, network-enabled television, digital video recorder, such as TIVO®, and/or automobile. User device 202 is configured to connect with the network 204, such as the general computer system or any of the components as described in FIG. 7. In alternate embodiments, there may be additional user devices, and additional intermediary networks that are established to connect the user device 202 or other user devices with the first webserver 208, second webserver 210, and/or the ad server 206.

The first webserver 208 and the second webserver 210 represent different servers that the user device 202 may access. In one embodiment, the first webserver 208 is associated with a first website or a first domain and the second webserver 210 is associated with a second website or a second domain. The advertisement ("ad") server 206 may also be referred to as a beacon server. The ad server 206 may provide advertisements for other webservers and may also receive and transfer behavioral profiles between webservers as described in FIG. 4 and FIG. 5. In one embodiment, the ad server 206 may be the same as or similar to the advertisement services server 110 from FIG. 1.

The ad server 206 is coupled with both the first webserver 208 and the second webserver 210. In one embodiment, the ad server 206 is coupled with the first webserver 208 and the second webserver 210 through network 204. As described in FIG. 4 and FIG. 5, the ad server 206 may receive a behavioral targeting profile from the first webserver 208 and may pass that profile and/or targeted advertisements to the second webserver 210 through different mechanisms as described below.

FIG. 3 is a block diagram of an alternate exemplary user system 300. The system 300 includes a user device 202 coupled with domain X 308 and domain Y 310. Both domain X 308 and domain Y 310 are coupled with a beacon server 306. The beacon server 306 is coupled with a database 312. Any of the components in FIG. 3 may be coupled with each other through one or more networks. The user device 202 was described above in FIG. 2 and the beacon server 306 may be the same as or similar to the ad server 206.

Domain X 308 and/or domain Y 310 may be a website domain address, including a plurality of web pages associated with that domain. For example, domain X 308 may be all websites and web pages associated with the domain yahoo.com®. Accordingly, any page within the domain yahoo.com is a part of that domain. In alternate embodiments, domain X 308 and the domain Y 310 may include or be associated with the first webserver 208 and the second webserver 210, respectively, from FIG. 2. In other words, domain X 308 may be stored on the first webserver 208 and domain Y 310 may be stored on the second webserver 210. Accordingly, access to domain X 308 is through the first webserver 208 and access to the domain Y 310 is through the second webserver 210.

In FIG. 3, domain X 308 includes beacon instructions for the transfer of a behavioral targeting profile. In other words, the pages within domain X 308 may each include a beacon that is configured to transfer behavioral data. A beacon is an electronic file that allows a web site to count or monitor users who visit a certain page or access certain cookies stored at the user device. In one embodiment, a beacon may be a 1×1 pixel that is a transparent image. The image may also be the same color as the background so it is invisible to a user. Accordingly, whenever the page is opened, the image must be downloaded and displayed. The downloading of the image may require a request from a server associated with the image and/or domain, such as the first webserver 208 associated with the domain X 308. In one example, the server, which stores the image, is the beacon server 306. The beacon server 306 knows how many times an image has been viewed based on how many times the image is downloaded. Accordingly, a beacon that is associated with domain X 308 may be downloaded from the beacon server 306 each time a page is visited from domain X 308.

Domain X 308 includes a beacon or beacon instructions that include reporting of behavioral data to the beacon server 306. The behavioral data may be a behavioral targeting profile that includes data or statistics on the particular user. The behavioral targeting profile may include data on the types of the websites that the user frequently visits within domain X 308. It may also include the types of advertisements or other content that the user views or selects. The behavioral targeting profile data may be used in selecting targeted advertisements that are specifically targeted to a user based on that user's past behavior and viewing habits.

When user device 202 visits domain X 308, the beacon instructions allow for the transfer of the behavioral targeting profile to the beacon server 306. In one example, when the URL of the beacon is resolved by the user device, it may trigger a get request for the image from the beacon server. In response to this get request, various functionality may be triggered on or by the beacon server. The behavioral targeting profile is transferred to the beacon server 306, which may store the profile in the database 312. In one example, the 1×1 transparent pixel beacon request may be an address such as http://www.domain.com/beacon/profile-transfer/profile=xyz. The behavioral targeting profile that is transferred is xyz. The profile xyz includes the behavioral targeting data but does not include any personalized or private information.

The database 312 may maintain storage of a plurality of behavioral targeting profiles from different users. Alternatively, the beacon server 306 may generate a cookie with the behavioral targeting data that is stored on the user device 202. When the user device 202 visits domain Y 310, the behavioral profile may be accessible from the cookie or from the database 312 through the beacon server 306. Although not shown, in one embodiment the beacon server 306 should be in domain Y 310. Accordingly, the transfer between the beacon server 306 and domain Y 310 is a transfer within one domain, domain Y. As shown in FIG. 3, the behavior targeting profile information is transferred from the beacon server 306 to domain Y 310. This transfer of the behavioral targeting profile information is anonymous. In the example above the behavioral targeting profile xyz is transmitted without any personalized information to establish an anonymous transfer. In particular, the website or page viewed from domain Y 310 may include advertisements that are selected by the beacon server 306 based on the behavioral targeting profile. Targeted advertisements may be displayed on a page as shown in FIG. 6.

FIG. 4 is a flowchart depicting an embodiment of the transfer of behavioral data in an exemplary system. As described below, the exemplary system in FIG. 4 may be the system 200 described in FIG. 2. FIG. 4 illustrates a process by which a behavioral targeting profile is transferred between webservers, such as the first webserver 208 and the second webserver 210.

In block 402, a user with a user device 202 visits a web page that is located on the first webserver 208. In block 404, the first webserver 208 or the web page may include beacon instructions. The beacon instructions include instructions on the transfer of a behavioral targeting profile. As discussed above, the beacon instructions may be a beacon address for a 1×1 transparent pixel such as http://www.domain.com/beacon/profile-transfer/profile=xyz that functions as instructions for the transfer of the behavioral targeting profile xyz. In block 406, the web page is downloaded from the first webserver 208 and displayed at the user device 202.

In block 408, the first webserver 208 may monitor the behavior of the user at the user device 202 and generate a behavioral targeting profile on the user. In particular, the behavioral targeting profile may include the browsing habits of the user, such as the type of content that the user frequently views and the advertisements that the user views and interacts with. The behavioral targeting profile may include data on the user from other sources, such as browsing habits from related websites or previous purchases made from various websites. In addition, previous information from the registration of a user with a particular website may be used including demographic information, such as sex, age, geographic location, and any other information provided by the user. However, the personal identification of the user is not made, so a name or social security number or phone number should not be used so that the user remains anonymous. In block 410, the first webserver 208 stores the behavioral targeting profile. In one embodiment, the behavioral targeting profile is stored as a cookie on the user device 202.

In block 412, the beacon instructions for the first webserver 208 may include instructions on the transfer of the behavioral targeting profile. In accordance with the beacon instructions, the first webserver 208 anonymously sends the behavioral targeting profile to the ad server 206 in block 414. The ad server 206 receives the behavioral targeting profile and either establishes a cookie with the behavioral targeting profile as in block 416, or stores the behavioral targeting profile in the database 312 as in block 418. In block 416, the ad server 206 or beacon server 306 establishes a cookie containing the behavioral targeting profile on the user device 202. The cookie is established for a particular domain, such that any website within the domain may access the behavioral targeting profile from the cookie. Accordingly, the behavioral targeting profile has been transferred from the first webserver 208 to the ad server 206 and is now available for access from other webservers (e.g. second webserver 210) through the ad server 206 as described in FIG. 5.

FIG. 5 is a flowchart depicting an alternate embodiment of the transfer of behavioral data in an exemplary system. As described below, the exemplary system in FIG. 5 may be the system 200 described in FIG. 2. FIG. 5 illustrates the use of a transferred behavioral targeting profile. In particular, a behavioral targeting profile may be transferred to an ad server 206 as described in FIG. 4 and accessible to other webservers as in FIG. 5. In block 502, a user, using user device 202, visits the second webserver 210. The second webserver 210 may include a website or a domain of web pages stored on the webserver and accessible by the user device 202. The second webserver 210 is associated with or has access to the ad server 204 as in block 504.

In one embodiment, the ad server 204 may include a database with marketing data and information that may be passed to any of the webservers, including providing targeted advertisements for various websites. Accordingly, in block 506, the second webserver 210 communicates with the ad server 204 or receives a cookie. In particular, in block 508, the second webserver 210 may access a cookie with a behavioral targeting profile that was generated at least in part from a different webserver or website. In one example, that advertisement requests from the ad server 204 may include a request to a particular domain. The cookie associated with that domain may include the behavioral targeting profile that is included in the cookie. The cookie may be sent to the second webserver 210 or the ad server 204 along with an ad request.

Alternatively, in block 510, the ad server 204 may retrieve the stored behavioral targeting profile from a database storing profiles. The behavioral targeting profile is used by the second webserver 210 or the ad server 204 to provide targeted advertisements as in block 512. In particular, the advertisements that are displayed on the web page from the second webserver 210 may be selected and placed by the ad server 204 which displays targeted advertisements based on the behavior targeting profile as in block 514. The web page with targeted advertisements is displayed on the user device 202 as in block 516.

FIG. 6 is an illustration of an exemplary page 600 displaying advertisements. In particular, page 600 may be a web page displayed from the Internet. The content 602 of the advertisement may include text, images, or other multimedia. The page 600 includes slots that are used for advertisements that are displayed to the user. In one embodiment, there may two top slot ads 604 and 606 displayed across the top of the page 600, and two side slot ads 608 and 610 displayed on the side of the content 602. The ad slots may display targeted advertisements generated based on the behavioral profile as discussed above. In one embodiment, advertisements are chosen based on the behavioral profile data, such as commonly viewed items or web pages and advertisements that the user interacts with. Accordingly, if the profile reflects that the user views sports websites frequently, then advertisements related to sports may be chosen.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 704 includes a cache or random access memory for the processor 702. In alternative embodiments, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the programmed processor 702 executing the instructions stored in the memory 704. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 700 may further include a display unit 714, such as a liquid crystal display (LCD), an organic light emitting diode (OLED), a flat panel display, a solid state display, a cathode ray tube (CRT), a projector, a printer or other now known or later developed display device for outputting determined information. The display 714 may act as an interface for the user to see the functioning of the processor 702, or specifically as an interface with the software stored in the memory 704 or in the drive unit 706.

Additionally, the computer system 700 may include an input device 716 configured to allow a user to interact with any of the components of system 700. The input device 716 may be a number pad, a keyboard, or a cursor control device, such as a mouse, or a joystick, touch screen display, remote control or any other device operative to interact with the system 700.

In a particular embodiment, as depicted in FIG. 7, the computer system 700 may also include a disk or optical drive unit 706. The disk drive unit 706 may include a computer-readable medium 710 in which one or more sets of instructions 712, e.g. software, can be embedded. Further, the instructions 712 may embody one or more of the methods or logic as described herein. In a particular embodiment, the instructions 712 may reside completely, or at least partially, within the memory 704 and/or within the processor 702 during execution by the computer system 700. The memory 704 and the processor 702 also may include computer-readable media as discussed above.

The present disclosure contemplates a computer-readable medium that includes instructions 712 or receives and executes instructions 712 responsive to a propagated signal, so that a device connected to a network 720 can communicate voice, video, audio, images or any other data over the network 720. Further, the instructions 712 may be transmitted or received over the network 720 via a communication port 718. The communication port 718 may be a part of the processor 702 or may be a separate component. The communication port 718 may be created in software or may be a physical connection in hardware. The communication port 718 is configured to connect with a network 720, external media, the display 714, or any other components in system 700, or combinations thereof. The connection with the network 720 may be a physical connection, such as a wired Ethernet connection or may be established wirelessly as discussed below. Likewise, the additional connections with other components of the system 700 may be physical connections or may be established wirelessly.

The network 720 may include wired networks, wireless networks, or combinations thereof. The wireless network may be a cellular telephone network, an 802.11, 802.16, 802.20, or WiMax network. Further, the network 720 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A computerized method for transferring a behavioral profile comprising:
   receiving, at a first web server, a request from a user for access to a web page;
   storing a behavioral profile as a cookie on a user device based at least in part on the user's interaction with the web page from the first web server, wherein the web page includes beacon instructions for transferring the behavioral profile;
   transferring the behavioral profile to a beacon server based on the beacon instructions;
   receiving, at a second web server, a request for another web page;
   accessing, by the second web server, the behavioral profile from the beacon server in response to the request received at the second web server;
   identifying a targeted advertisement based on the behavioral profile; and
   providing, by the second web server, the another web page including the targeted advertisement in response to the request for the another web page.

2. The method of claim 1 wherein the beacon instructions comprise a universal resource locator ("URL").

3. The method of claim 1 wherein the behavior profile is stored in a database coupled with the beacon server and accessible by the first web server and the second web server.

4. The method of claim 3, wherein the step of accessing, by the second web server, the behavioral profile comprises retrieving the behavioral profile from the database.

5. The method of claim 1 wherein the beacon instructions are part of a beacon file embedded in the web page that are activated when the web page is transmitted.

6. The method of claim 1 wherein the beacon instructions cause the behavioral profile to be sent to the beacon server.

7. The method of claim 1 wherein the behavioral profile excludes personalized information, further wherein the transfer of the behavioral profile is anonymous.

* * * * *